(12) United States Patent
Kakita et al.

(10) Patent No.: US 10,750,166 B2
(45) Date of Patent: Aug. 18, 2020

(54) ABNORMALITY DETECTION APPARATUS

(71) Applicant: DENSO TEN Limited, Kobe-shi, Hyogo (JP)

(72) Inventors: Naoshi Kakita, Kobe (JP); Kohji Ohnishi, Kobe (JP); Takayuki Ozasa, Kobe (JP); Teruhiko Kamibayashi, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 0 days.

(21) Appl. No.: 16/556,446

(22) Filed: Aug. 30, 2019

(65) Prior Publication Data

US 2020/0120331 A1   Apr. 16, 2020

(30) Foreign Application Priority Data

Oct. 12, 2018 (JP) ................. 2018-193686

(51) Int. Cl.
*H04N 17/00* (2006.01)
*H04N 5/243* (2006.01)
*H04N 5/28* (2006.01)

(52) U.S. Cl.
CPC ........... *H04N 17/002* (2013.01); *H04N 5/243* (2013.01); *H04N 5/28* (2013.01)

(58) Field of Classification Search
CPC ......... H04N 17/002; H04N 5/243; H04N 5/28
See application file for complete search history.

(56) References Cited

U.S. PATENT DOCUMENTS

| | | | | |
|---|---|---|---|---|
| 9,232,140 B2* | 1/2016 | Saitwal | ............ | H04N 5/23267 |
| 9,508,156 B1* | 11/2016 | Linzer | ............ | G06T 7/223 |
| 2003/0228058 A1* | 12/2003 | Xie | ............ | G08B 13/19604 382/218 |
| 2005/0286797 A1* | 12/2005 | Hayaishi | ............ | H04N 5/3675 382/274 |
| 2006/0175549 A1* | 8/2006 | Miller | ............ | G08B 13/19643 250/334 |
| 2007/0071342 A1* | 3/2007 | Bilbrey | ............ | G06T 5/20 382/254 |
| 2007/0071343 A1* | 3/2007 | Zipnick | ............ | G06T 5/50 382/254 |
| 2007/0071344 A1* | 3/2007 | Ouzilevski | ............ | G06T 5/20 382/254 |
| 2008/0225147 A1* | 9/2008 | Dakemoto | ............ | H04N 5/2357 348/300 |
| 2010/0033583 A1* | 2/2010 | Tomita | ............ | H04N 5/23248 348/208.5 |
| 2010/0324437 A1* | 12/2010 | Freeman | ............ | A61B 5/085 600/529 |

(Continued)

FOREIGN PATENT DOCUMENTS

JP      2016-171509 A      9/2016

*Primary Examiner* — Brian P Yenke
(74) *Attorney, Agent, or Firm* — Oliff PLC

(57) ABSTRACT

An abnormality detection apparatus for detecting an abnormality of a camera to be mounted on a mobile body includes a processor and associated memory configured to perform a determination process of determining a presence or absence of the abnormality of the camera based on a temporal change of a position of a feature point that is extracted from a frame image photographed by the camera and suppress a gain change in an Automatic Gain Control ("AGC") circuit of the camera when the determination process is performed.

11 Claims, 15 Drawing Sheets

(56) References Cited

U.S. PATENT DOCUMENTS

| | | | |
|---|---|---|---|
| 2012/0026326 A1* | 2/2012 | Itoh | G06K 9/00771 |
| | | | 348/143 |
| 2013/0114853 A1* | 5/2013 | Sengupta | G06K 9/00248 |
| | | | 382/103 |
| 2016/0127656 A1* | 5/2016 | Honda | H04N 5/2352 |
| | | | 348/229.1 |
| 2016/0269401 A1* | 9/2016 | Saito | G06K 9/00275 |
| 2017/0116743 A1* | 4/2017 | Matsumoto | G06K 9/00805 |
| 2017/0166126 A1* | 6/2017 | Sypitkowski | H04N 5/23238 |
| 2017/0195556 A1* | 7/2017 | Emi | G08B 25/00 |
| 2018/0103185 A1* | 4/2018 | Kim | H04N 5/225 |
| 2018/0249059 A1* | 8/2018 | Jeong | H04N 5/243 |
| 2018/0352175 A1* | 12/2018 | Jonsson | H04N 5/243 |
| 2019/0098224 A1* | 3/2019 | Kobayashi | H01L 27/307 |
| 2019/0206060 A1* | 7/2019 | Matsumoto | G06T 7/0002 |
| 2019/0325585 A1* | 10/2019 | Kakita | G06K 9/00791 |
| 2019/0325607 A1* | 10/2019 | Ohnishi | B60R 1/00 |

* cited by examiner

ABNORMALITY DETECTION APPARATUS

BACKGROUND OF THE INVENTION

Field of the Invention

The invention relates to an abnormality detection apparatus, an abnormality detection system and an abnormality detection method.

Description of the Background Art

Conventionally, a camera used for parking assistance, and the like, is mounted on a vehicle, such as an automobile. For example, an in-vehicle camera to be mounted on the vehicle is installed in a fixed state on the vehicle before the vehicle is shipped from a factory. However, the in-vehicle camera may deviate from a factory-installed position due to, for example, an unexpected contact, aging, and the like. When an installation position and an angle of the in-vehicle camera deviate, an error occurs in a steering quantity of a steering wheel, and the like, determined using a camera image. Therefore, it is important to detect an installation deviation of the in-vehicle camera.

Japanese published unexamined application No. 2016-171509 (Patent Document 1) discloses a technology that performs a calibration of an on-vehicle camera using a pattern projected from a video output apparatus installed in the vehicle. The Patent Document also discloses that a vehicle controller controls a vehicle device, such as a brake, to maintain a fixed distance or more between the vehicle and a forward obstacle in order to ensure a space required for pattern projection. Furthermore, the Patent Document 1 discloses that the calibration of the on-vehicle camera is performed using feature points acquired from a crosswalk and a host vehicle body.

An environment in which the in-vehicle camera is installed easily changes, for example, depending on a traveling state of the vehicle, and the like. When the installation deviation of the in-vehicle camera is detected using the feature points, if a change in the environment in which the in-vehicle camera is installed is large, the installation deviation of the in-vehicle camera may be erroneously detected.

SUMMARY OF THE INVENTION

According to one aspect of the invention, an abnormality detection apparatus for detecting an abnormality of a camera to be mounted on a mobile body includes a processor and associated memory configured to perform a determination process of determining a presence or absence of the abnormality of the camera based on a temporal change of a position of a feature point that is extracted from a frame image photographed by the camera and suppress a gain change in an Automatic Gain Control ("AGC") circuit of the camera when the determination process is performed.

As a result, it is possible to suppress erroneous detection of the abnormality of the camera to be mounted on the mobile body.

According to another aspect of the invention, the processor is configured to select either (i) a normal update cycle, which is used as the update cycle when the determination process is not performed, or (ii) an update cycle for the determination process, which is used as the update cycle when the determination process is performed and is longer than the normal update cycle.

As a result, it is possible to create an environment in which it is easy to determine a presence or absence of the camera deviation and determine the presence or absence of the camera deviation.

These and other objects, features, aspects and advantages of the invention will become more apparent from the following detailed description of the invention when taken in conjunction with the accompanying drawings.

DESCRIPTION OF THE EMBODIMENTS

An exemplified embodiment of the invention will be described in detail hereinafter with reference to accompanying drawings. A case in which a mobile body to which the invention is applicable is a vehicle will be described as an example, but the mobile body to which the invention is applicable is not limited to the vehicle. The invention may be applicable to, for example, a robot, and the like. The vehicle widely includes a conveyance having wheels, for example, an automobile, a train, an unmanned carrier, or the like.

In the following description, a straight travel direction of the vehicle, which is a direction from a driver's seat toward a steering wheel, is referred to as a "front direction". A straight travel direction of the vehicle, which is a direction from the steering wheel toward the driver's seat, is referred to as a "back direction". A direction perpendicular to the straight travel direction of the vehicle and a vertical line, which is a direction from a right side toward a left side of a driver who faces forward, is referred to as a "left direction". A direction perpendicular to the straight travel direction of the vehicle and the vertical line, which is a direction from the left side toward the right side of the driver who faces forward, is referred to as a "right direction". The front, back, left and right directions are simply used for explanation and do not limit an actual positional relationship and direction.

<1. Abnormality Detection System>

Figure 1:
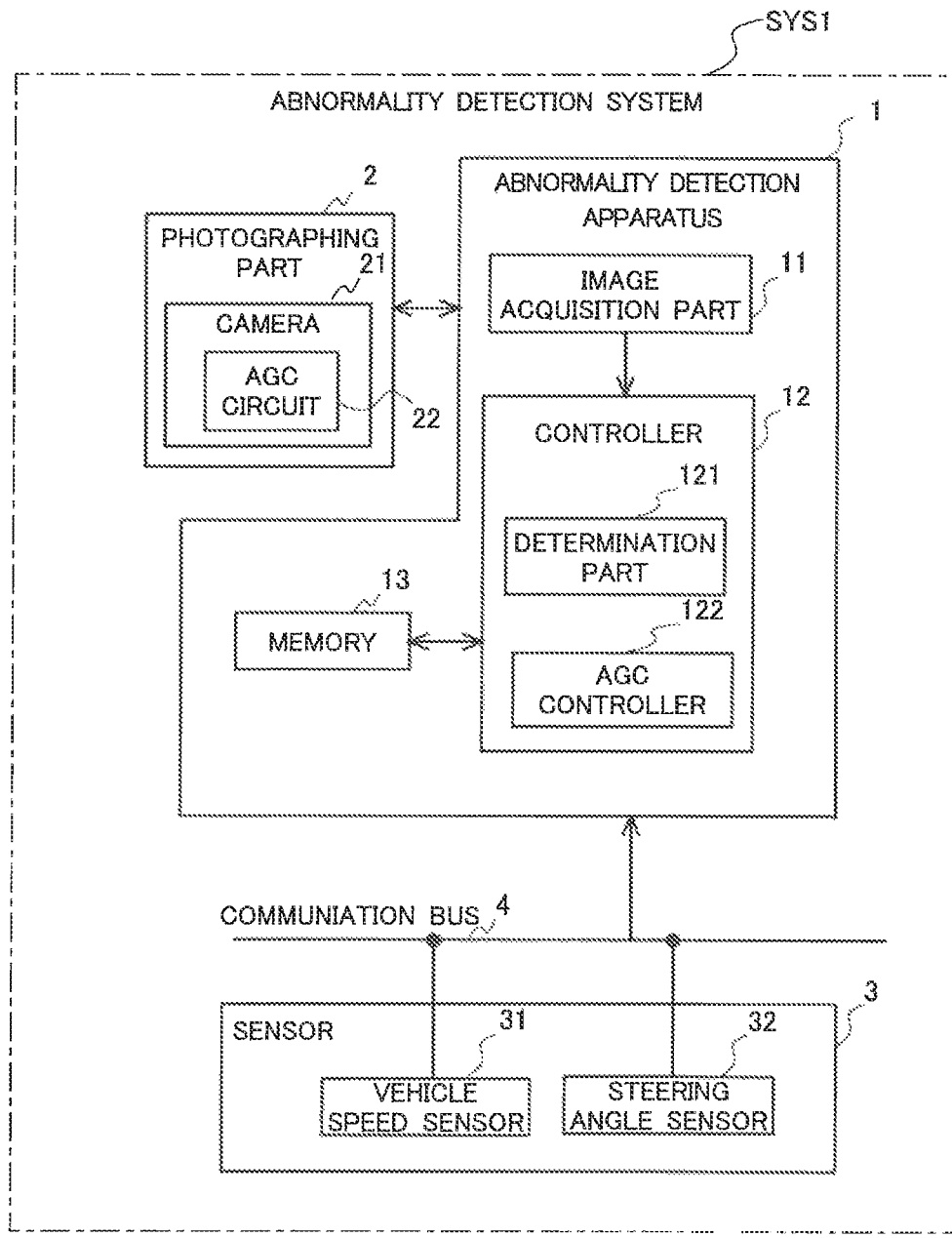
FIG. 1 is a block diagram illustrating a configuration of an abnormality detection system.

FIG. 1 is a block diagram illustrating a configuration of an abnormality detection system SYS1 according to this embodiment. As illustrated in FIG. 1, the abnormality detection system SYS1 includes an abnormality detection apparatus 1, a photographing part 2 and a sensor 3. In this embodiment, an abnormality means a state in which an installation deviation of a camera (hereinafter, referred to as a "camera deviation") that is mounted on the vehicle has occurred. That is, the abnormality detection system SYS1 is a system for detecting the camera deviation of the camera to be mounted on the vehicle. Specifically, the abnormality detection system SYS1 is, for example, a system for detecting the camera deviation deviated from a reference installation position, such as a factory-installed position of the camera on vehicle. The camera deviation widely includes an axis deviation, a deviation due to rotation around an axis, and the like. The axis deviation includes a deviation of an installation position, a deviation of an installation angle, and the like. The abnormality detection system SYS1 is configured to create an environment in which it is easy to determine a presence or absence of the camera deviation and determine the presence or absence of the camera deviation. Therefore, it is possible to reduce a possibility of erroneous detection of the camera deviation. The effect will be clarified by the following explanation.

The photographing part 2 is provided on the vehicle to recognize a situation around the vehicle. The photographing part 2 includes a camera 21. That is, the abnormality detection system SYS1 includes a camera. The camera 21 is an in-vehicle camera. The camera 21 is configured by using, for example, a fish-eye lens. The camera 21 is connected to the abnormality detection apparatus 1 via a wireless or wired connection and outputs a photographed video to the abnormality detection apparatus 1.

In this embodiment, the photographing part 2 includes a plurality of the cameras 21. The plurality of the cameras 21 is four cameras including a front camera, a rear camera, a left side camera and a right side camera. The front camera photographs a front image of the vehicle. The rear camera photographs a rear image of the vehicle. The left side camera photographs a left side image of the vehicle. The right side camera photographs a right side image of the vehicle. The four cameras 21 can photograph all surrounding images of the vehicle in a horizontal direction of the vehicle. As a result, for example, it is possible to safely perform parking assistance of the vehicle. However, a number of the cameras 21 may be one or plural other than four.

Each of the four cameras 21 has an AGC (Automatic Gain Control) circuit 22. The AGC circuit 22 controls a level of a video signal that is output to be kept constant regardless of a level of an input video signal. In this embodiment, the AGC circuit 22 controls brightness (luminance) of a video that is output to be kept constant. The AGC circuit 22 may control hue of the video that is output to be kept constant.

Figure 2:
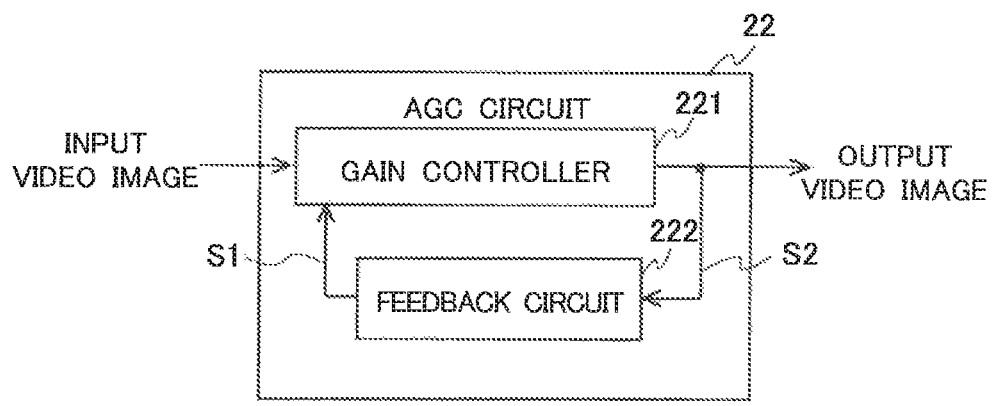
FIG. 2 illustrates a schematic configuration of an AGC circuit.

FIG. 2 illustrates a schematic configuration of the AGC circuit 22. The AGC circuit 22 includes a gain controller 221 and a feedback circuit 222. The gain controller 221 increases or decreases a gain of a video input signal according to a gain control signal S1 that is input from the feedback circuit 222, and outputs the gain of the video input signal as a video output signal. A feedback signal S2 according to the video output signal that is output from the gain controller 221 is input to the feedback circuit 222. The feedback circuit 222 includes a level comparator, and the like. The feedback circuit 222 compares a level of a signal obtained by performing a predetermined process on the feedback signal S2 with a reference target value and calculates the gain control signal S1 according to a comparison result. The gain control signal S1 is sent to the gain controller 221.

The abnormality detection apparatus 1 detects the abnormality of the camera 21 to be mounted on the mobile body. Specifically, the abnormality detection apparatus 1 detects the camera deviation of the camera 21 itself based on information from the camera 21 mounted on the vehicle. That is, the abnormality detection apparatus 1 is an apparatus for detecting the camera deviation. By using the abnormality detection apparatus 1, it is possible to rapidly detect the camera deviation while the vehicle is traveling. By using the abnormality detection apparatus 1, for example, it is possible to prevent driving assistance, such as parking assistance, from being performed in a state in which the camera deviation has occurred. In this embodiment, since the photographing part 2 has the plurality of the cameras 21, the abnormality detection apparatus 1 detects the camera deviation for each of the plurality of the cameras 21.

In this embodiment, the abnormality detection apparatus 1 is mounted on the vehicle mounting the camera for which detection of the camera deviation is performed. Hereinafter, a vehicle on which the abnormality detection apparatus 1 is mounted may be referred to as a host vehicle. However, the abnormality detection apparatus 1 may be arranged in a place other than the vehicle on which the camera is mounted for which the detection of the camera deviation is performed. For example, the abnormality detection apparatus 1 may be arranged in a data center, etc., communicable with the vehicle having the camera 21.

The sensor 3 has a plurality of sensors that detect information about the vehicle on which the camera 21 is mounted. In this embodiment, the sensor 3 includes a vehicle speed sensor 31 and a steering angle sensor 32. The vehicle speed sensor 31 detects a speed of the vehicle and outputs an electrical signal according to the detected value. The steering angle sensor 32 detects a rotation angle of a steering wheel of the vehicle and outputs the electrical signal according to the detected value. The vehicle speed sensor 31 and the steering angle sensor 32 are connected to the abnormality detection apparatus 1 via a communication bus 4. That is, speed information of the vehicle acquired by the vehicle speed sensor 31 is input to the abnormality detection apparatus 1 via the communication bus 4. Rotation angle information of the steering wheel of the vehicle acquired by the steering angle sensor 32 is input to the abnormality detection apparatus 1 via the communication bus 4. The communication bus 4 may be a CAN (Controller Area Network) Bus.

<2. Abnormality Detection Apparatus>

As illustrated in FIG. 1, the abnormality detection apparatus 1 includes an image acquisition part 11, a controller 12 and a memory 13.

The image acquisition part 11 periodically acquires an analog or digital photographic image (frame image) from the camera 21 of the host vehicle in a predetermined cycle (e.g., a cycle of $\frac{1}{30}$ second). In this embodiment, since the photographing part 2 has the plurality of the cameras 21, the image acquisition part 11 acquires the frame image from each of the plurality of the cameras 21. When the acquired frame image is an analog frame image, the analog frame image is converted into a digital frame image (A/D conversion). The image acquisition part 11 performs a predetermined image process on the acquired frame image and outputs the processed frame image to the controller 12.

The controller 12 is, for example, a microcomputer and integrally controls the entire abnormality detection apparatus 1. The controller 12 includes a CPU, a RAM, a ROM, and the like. The memory 13 is, for example, a nonvolatile memory, such as a flash memory, and stores various types of information. The memory 13 stores various types of programs and various types of data.

Specifically, the controller 12 includes a determination part 121 and an AGC controller 122. Functions of the determination part 121 and the AGC controller 122 included in the controller 12 are implemented by the CPU performing arithmetic processing, for example, in accordance with a program stored in the memory 13. In other words, the abnormality detection apparatus 1 includes the determination part 121 and the AGC controller 122.

At least any one of the determination part 121 and the AGC controller 122 included in the controller 12 may be configured by hardware, such as an ASIC (Application Specific Integrated Circuit) or an FPGA (Field Programmable Gate Array). The determination part 121 and the AGC controller 122 included in the controller 12 are conceptual components. The functions performed by one of the components may be distributed to a plurality of components or the functions possessed by a plurality of components may be integrated into one of the components. Functions of the image acquisition part 11 may be implemented by the CPU of the controller 12 performing arithmetic processing in accordance with the program.

The determination part 121 performs a determination process of determining a presence or absence of the abnormality of the camera 21 based on a temporal change of a position of a feature point that is extracted from the frame image photographed by the camera 21. The feature point is a point that can be distinctively detected in the frame image, such as an intersection of edges in the frame image. The feature point is extracted from, for example, a corner of a road surface marking with white lines, etc., cracks, stains and gravels on a road surface, and the like. The feature point may be extracted, for example, by using a known method, such as a Harris operator, or the like.

In this embodiment, the determination part 121 extracts the feature point from each of the frame images input by the camera 21. The determination part 121 calculates an optical flow indicating movements of the feature points between two frame images input at predetermined time intervals and estimates a movement amount of the vehicle based on the optical flow. The movement amount that is calculated based on the speed of the vehicle obtained from the vehicle speed sensor 31 is a correct value and a size of a deviation of an estimation value relative to the correct value is determined. When the size of the deviation exceeds a predetermined threshold value, it is determined that the camera deviation has occurred. A detailed example of the determination process by the determination part 121 will be described later.

When the determination part 121 performs the determination process, the AGC controller 122 controls to suppress a gain change in the AGC circuit 22 of the camera 21. Specifically, the AGC controller 122 switches an update cycle of the gain in the AGC circuit 22 to acquire the frame image for the determination process.

One of the two frame images used for tracking the position of the feature point is a first frame image and the other one is a second frame image. When the gain is updated by the AGC controller 122 before the second frame image is output after the camera 21 has output the first frame image, a difference of the luminance between the first frame image and the second frame image increases. Thus, in some cases, the feature point cannot be accurately tracked between the first frame image and the second frame image. In this respect, in this embodiment, the AGC controller 122 controls the update cycle of the gain. As a result, it is possible to configure that the gain is not updated while the camera 21 acquires the frame image for the determination process, and it is possible to suppress inappropriate tracking of the feature point due to a gain adjustment by the AGC circuit 22. In the above, the update cycle is controlled as one example of a control mode for suppressing the gain change in the determination process. However, the gain change during the determination process may be controlled so that a change amount of the gain falls within a predetermined range smaller than a range during a normal process. For example, the change amount of the gain relative to a feedback control amount may be made smaller than that during the normal process. Furthermore, the update cycle may be controlled as well as the change amount of the gain may be controlled.

Figure 3:
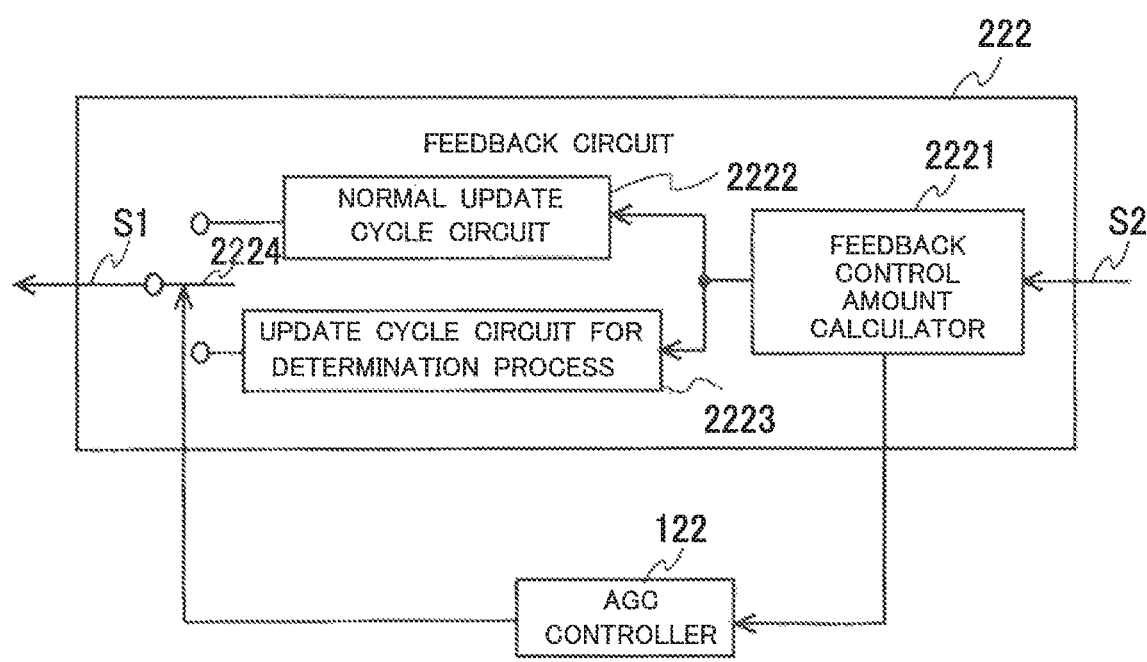
FIG. 3 is a schematic diagram illustrating a relation between an AGC controller and a feedback circuit.

FIG. 3 is a schematic diagram illustrating a relation between the AGC controller 122 and the feedback circuit 222. The feedback circuit 222 is included in the AGC circuit. As illustrated in FIG. 3, the feedback circuit 222 includes a feedback control amount calculator 2221, a normal update cycle circuit 2222, an update cycle circuit for the determination process 2223 and a switch 2224.

The feedback control amount calculator 2221 calculates the feedback control amount based on the input feedback signal S2. The feedback control amount calculator 2221 includes the level comparator. In this embodiment, the feedback control amount is an amount for controlling the gain of the gain controller 221 and the gain control signal S1 described above. The feedback control amount calculator 2221 outputs the calculated feedback control amount to the AGC controller 122.

The normal update cycle circuit 2222 outputs the gain control signal S1 calculated by the feedback control amount calculator 2221 to the gain controller 221 in a normal update cycle. The normal update cycle is used as the update cycle of the gain in the AGC circuit 22 when the determination process is not performed. Specifically, the normal update cycle is used at a normal time at which the frame image for the determination process is not acquired.

The update cycle circuit for the determination process 2223 outputs the gain control signal S1 calculated by the feedback control amount calculator 2221 to the gain controller 221 in an update cycle for the determination process. The update cycle for the determination process is used as the update cycle of the gain in the AGC circuit 22 when the determination process is performed. The update cycle for the determination process is longer than the normal update cycle. Specifically, the update cycle for the determination process is used when the frame image for the determination process is acquired.

The switch 2224 is switched between the normal update cycle circuit 2222 and the update cycle circuit for the determination process 2223. When the normal update cycle circuit 2222 is selected by the switch 2224, the gain control signal S1 is input to the gain controller 221 in the normal update cycle. That is, the AGC circuit 22 updates the gain in the normal update cycle. On the other hand, when the update cycle circuit for the determination process 2223 is selected the switch 2224, the gain control signal S1 is input to the gain controller 221 in the update cycle for the determination process. That is, the AGC circuit 22 updates the gain in the update cycle for the determination process.

A length of the update cycle for the determination process is equal to or longer than a time required for the camera 21 to acquire at least two frame images for the determination process. Thus, while the camera acquires the two frame images for tracking the feature point, it is possible to prevent the gain from being updated by the AGC circuit 22. That is, it is possible to avoid inaccurate tracking of the feature point due to an operation of the AGC circuit 22. When the length of the update cycle for the determination process is increased, more frame images for the determination process are obtained while the gain of the AGC circuit 22 is constant. However, when the length of the update cycle for the determination process is made too long, it will be in the same state as when the AGC circuit 22 is stopped, which is not preferable. The length of the update cycle for the determination process is preferably equal to or shorter than a time required for the camera 21 to acquire about 16 frame images for the determination process.

The switch 2224 is provided switchably by an instruction from the AGC controller 122. In other words, the AGC controller 122 is configured to select either the normal update cycle or the update cycle for the determination process. Thus, when the abnormality detection apparatus 1 wishes to perform the determination process of the presence or absence of the camera deviation, the abnormality detection apparatus 1 switches the update cycle of the gain of the AGC circuit 22 and creates the environment in which it is easy to determine the presence or absence of the camera deviation. When the frame image for the determination process is not acquired, the AGC controller 122 can operate the AGC circuit 22 appropriately by selecting the normal update cycle by the switch 2224.

When the feedback control amount that is a gain control amount in the AGC circuit 22 becomes equal to or greater than a predetermined amount while the AGC controller 122 selects the update cycle for the determination process, the AGC controller 122 forcibly switches setting of the update cycle of the gain in the AGC circuit 22 to the normal update cycle. The feedback control amount may be an amount for increasing a current gain or an amount for decreasing the current gain. The AGC controller 122 forcibly switches the setting of the update cycle of the gain in the AGC circuit 22 to the normal update cycle when the amount for increasing or decreasing the current gain is equal to or greater than a predetermined amount.

In this embodiment, in a state in which the feedback control amount has become equal to or greater than the predetermined amount, it is assumed that a brightness environment in which the camera 21 is placed has greatly changed. Even when the frame image for the determination process is acquired in such a state, there is a high possibility that the tracking of the feature point cannot be performed correctly. As a result, the AGC controller 122 returns the update cycle of the gain in the AGC circuit 22 to the normal update cycle and temporarily stops acquisition of the frame image for the determination process. That is, it is possible to prevent the determination process from being performed in a state in which the tracking of the feature point may become inappropriate and suppress an occurrence of erroneous detection of the camera deviation.

Figure 4:
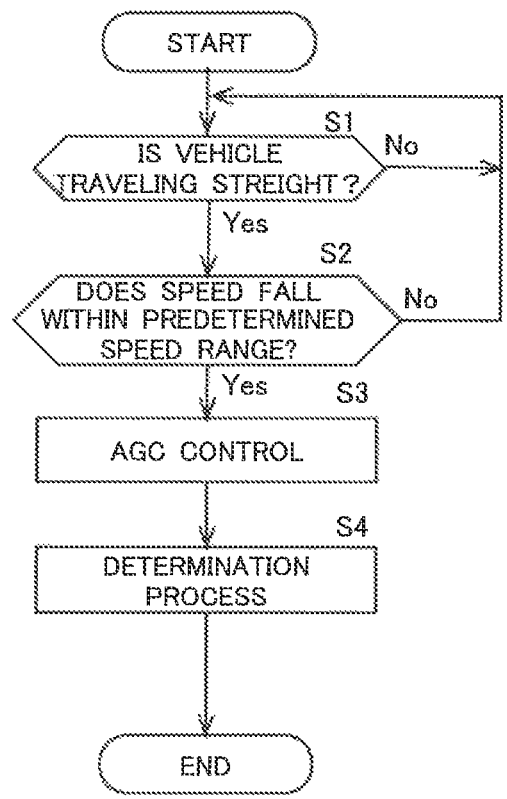
FIG. 4 is a flowchart illustrating one example of a detection process of a camera deviation.

FIG. 4 is a flowchart illustrating one example of a detection process of the camera deviation by the abnormality detection apparatus 1. The detection process of the camera deviation by the abnormality detection apparatus 1 may be, for example, performed for each predetermined period (for each one-week period, etc.), for each predetermined travel distance (for each 100 kin, etc.), for each starting of an engine (for each ignition (IG) on, etc.), for each time at which a number of times of starting the engine reaches a predetermined number of times, and the like. In this embodiment, since the photographing part 2 includes four cameras 21, the detection process of the camera deviation shown in FIG. 4 is performed for each of the cameras 21. In order to avoid overlapped description, the detection process of the camera deviation will be hereinafter described using a case in which one of the cameras 21 is a front camera as a representative example.

As illustrated in FIG. 4, first, it is monitored whether or not the vehicle on which the camera 21 is mounted is traveling straight (a step S1). A determination whether or not the vehicle is traveling straight can be made, for example, based on the rotation angle information of the steering wheel that is obtained from the steering angle sensor 32. Traveling straight means traveling straight in both forward and backward directions.

Monitoring of the step S1 is repeated until a straight traveling of the vehicle is detected. That is, a process related to the camera deviation is advanced on a condition that the vehicle is traveling straight. Thus, since the process is performed without using information obtained when a traveling direction of the vehicle is curved, information processing is prevented from becoming complex.

When it is determined that the vehicle is traveling straight (Yes in the step S1), it is confirmed whether or not the speed of the vehicle falls within a predetermined speed range (a step S2). The predetermined speed range is, for example, between 3 km/h and 5 km/h. When the speed of the vehicle is too high, it becomes difficult to track the feature point. Therefore, the speed of the vehicle is preferably 5 km/h or less, but is not particularly limited thereto. When the speed of the vehicle is too low, it becomes difficult for the vehicle speed sensor 31 to measure the speed of the vehicle. Therefore, the speed of the vehicle is preferably 3 km/h or more, but is not particularly limited thereto.

When the speed of the vehicle falls outside the predetermined speed range (No in the step S2), the process returns to the step S and the processes after the step S1 are performed. That is, the process related to the camera deviation is advanced on the condition that the vehicle is traveling straight and the speed of the vehicle falls within the predetermined range.

Figure 5:
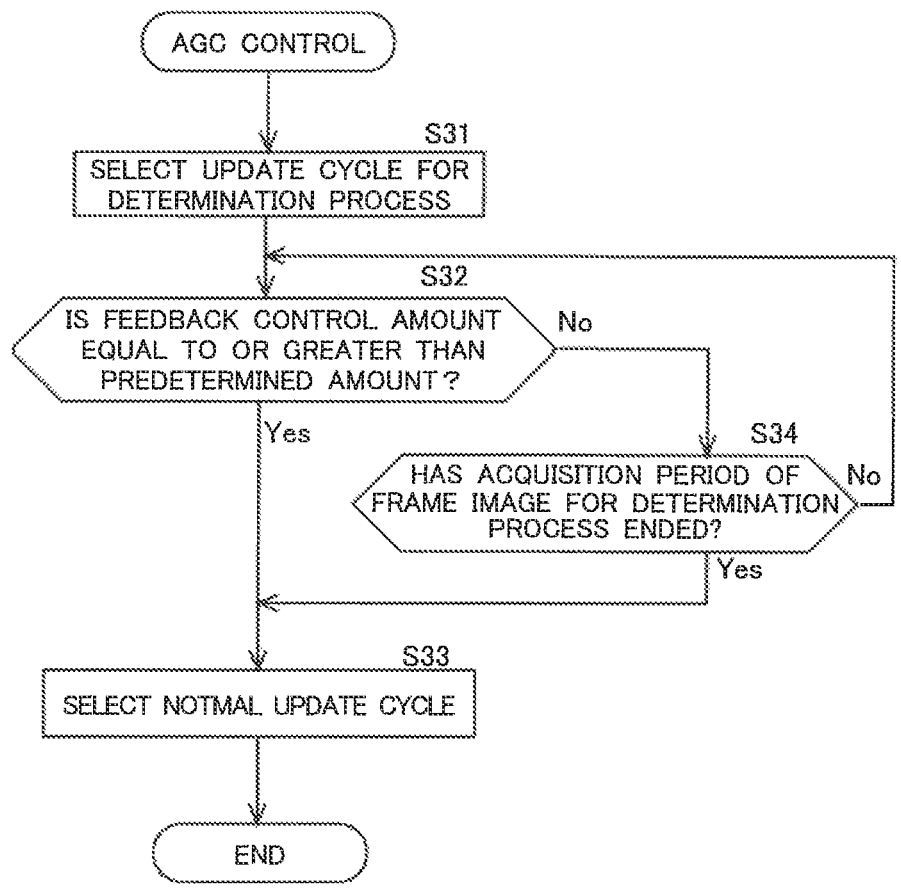
FIG. 5 is a flowchart illustrating one example of a control process by the AGC controller.

When it is determined that the vehicle is traveling within the predetermined speed range (Yes in the step S2), the AGC controller 122 starts control of the update cycle of the gain in the AGC circuit 22 (a step S3). FIG. 5 is-a flowchart illustrating one example of a control process by the AGC controller 122. FIG. 5 is a flowchart illustrating a detailed example of the step S3 shown in FIG. 4.

The AGC controller 122 first selects the update cycle for the determination process as the update cycle of the gain using the switch 2224 (a step S31). As a result, in the AGC circuit 22, the update cycle of the gain is switched from the normal update cycle to the update cycle for the determination process.

Next, the AGC controller 122 confirms whether or not the feedback control amount that is acquired from the feedback circuit 222 is equal to or greater than a predetermined amount (a step S32). When the feedback control amount is equal to or greater than the predetermined amount (Yes in the step S32), the AGC controller 122 selects the normal update cycle as the update cycle of the gain using the switch 2224 (a step S33). Thus, in the AGC controller 22, the update cycle of the gain is switched from the update cycle for the determination process to the normal update cycle. When the feedback control amount is equal to or greater than the predetermined amount, it is assumed that the brightness environment in which the camera 21 is placed has greatly changed. Thus, the update cycle of the gain is returned to the normal update cycle and the acquisition of the frame image for the determination process is temporarily stopped. The acquisition of the frame image for the determination process may be restarted at a time point at which the gain is stable.

On the other hand, when the feedback control amount is smaller than the predetermined amount (No in the step S32), the AGC controller 122 confirms whether or not an acquisition period of the frame image for the determination process has ended (a step S34). The acquisition period of the frame image for the determination process is a period in which at least two frame images for the determination process can be acquired. When the acquisition period of the frame image for the determination process has not ended (No in the step S34), the AGC controller 122 maintains selection of the update cycle for the determination process and the process returns to the step S32. When the acquisition period of the frame image for the determination process has ended (No in the step S34), the AGC controller 122 selects the normal update cycle (the step S33). In this case, it means that the acquisition of the frame image for the determination process has been normally performed. When the frame image for the determination process has been normally acquired, the AGC controller 122 ends the control of the update cycle of the gain. The AGC controller 122 restarts the control of the update cycle of the gain at a time point at which the acquisition of the frame image for the determination process is required.

Figure 6:
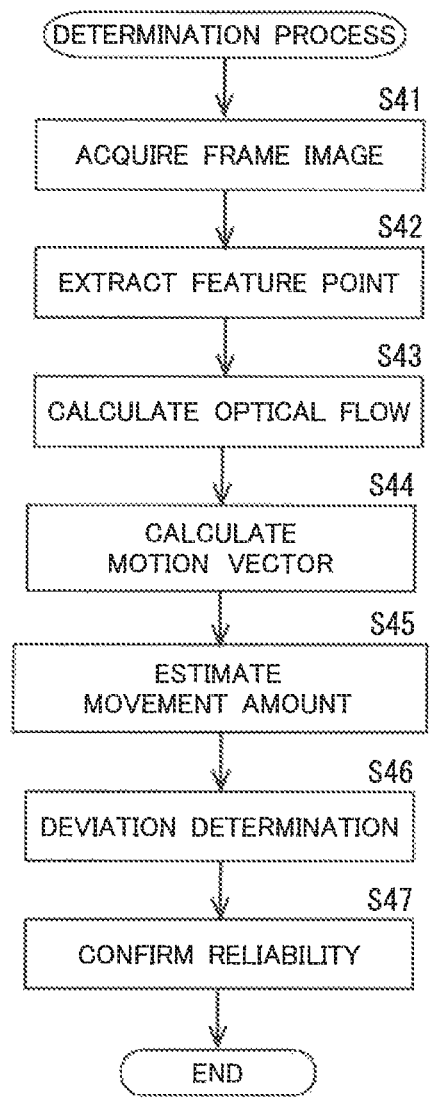
FIG. 6 is a flowchart illustrating one example of a determination process.

Referring back to FIG. 4, the control of the update cycle of the gain by the AGC controller 122 is started, the determination part 121 starts the determination process. FIG. 6 is a flowchart illustrating one example of the determination process by the determination part 121. As illustrated in FIG. 6, first, the frame image that is used for the determination process is acquired (a step S41). Specifically, the frame image for the determination process is obtained in a period in which the gain of the AGC circuit 22 is constant without being updated. That is, the determination part 121 determines the presence or absence of the abnormality of the camera using the frame image acquired in the period in which the gain of the AGC circuit 22 is constant. Since the update cycle of the gain is switched to the update cycle for the determination process and is longer than the normal update cycle, a plurality of the frame images can be acquired in the period in which the gain is constant. Thus, a large difference in the brightness (luminance) between the frame images used for tracking the feature point is prevented from being produced. As a result, the tracking of the feature point can be accurately performed.

As described above, the update cycle for the determination process may be forcibly returned to the normal update cycle. When the update cycle for the determination process is forcibly returned to the normal update cycle, the frame image acquired after being returned to the normal update cycle are not used for the determination process. The frame image acquired before being switched to the normal update cycle are used for the determination process.

Figure 7:
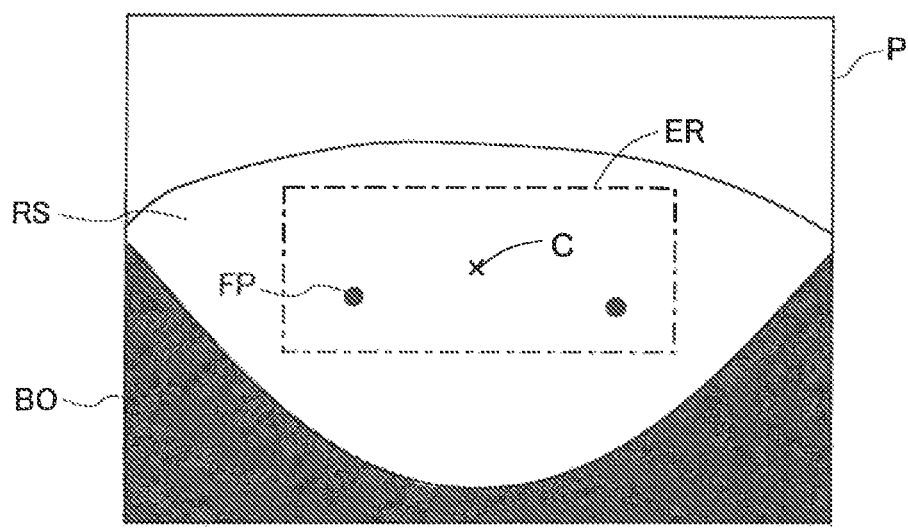
FIG. 7 illustrates a method of extracting a feature point.

When the frame image for the determination process has been acquired, the determination part 121 extracts the feature point from the frame image (a step S42). FIG. 7 illustrates a method of extracting a feature point FP. FIG. 7 schematically illustrates a frame image P photographed by the camera 21 (front camera). As illustrated in FIG. 7, the determination part 121 sets a predetermined extraction range-ER on the frame image P. The determination part 121 extracts the feature point FP from the predetermined extraction range ER. The predetermined extraction range ER is set to a position in which a portion of a road surface RS is reflected. The predetermined extraction range ER is preferably set in a wide range including a center C of the frame image P. As a result, even when occurrence positions of the feature points FP are not uniform and the feature points FP are unevenly distributed, the feature points FP can be extracted.

In FIG. 7, a number of the feature points FP is two, but this number is merely for purposes of convenience and does not show an actual number. A large number of the feature points FP are extracted from the road surface having many irregularities, for example, an asphalt road surface.

Referring back to FIG. 6, when the feature points FP have been extracted, the determination part 121 calculates the optical flow indicating movements of the feature points FP between two frame images photographed at a predetermined time interval (a step S43). The predetermined time interval may be the same as an acquisition cycle (e.g., the cycle of ⅓₀ second) of the photographic image of the image acquisition part 11.

Figure 8:
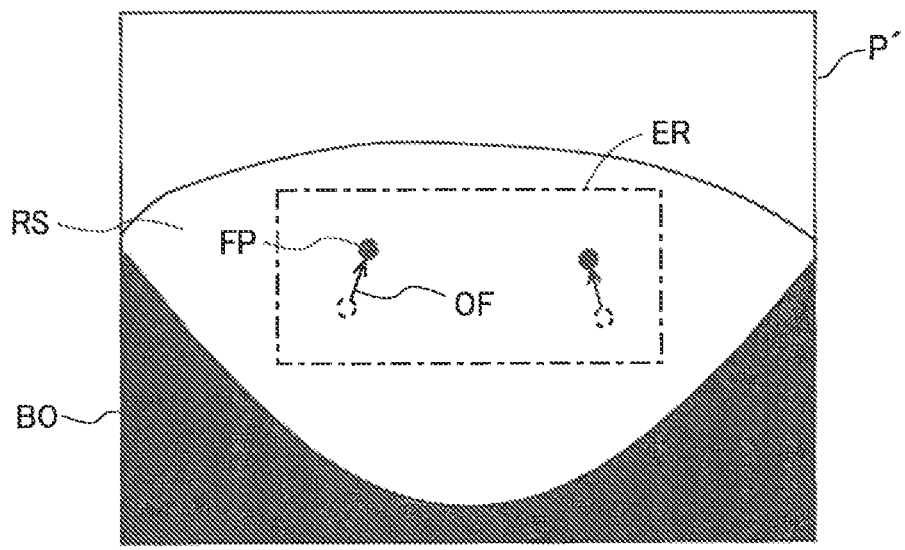
FIG. 8 illustrates a method of calculating an optical flow.

FIG. 8 illustrates a method of calculating an optical flow OF. FIG. 8 is a schematic diagram illustrated for purposes of convenience in the same manner as FIG. 7. FIG. 8 shows a frame image (current frame image) P' photographed by the camera 21 after the predetermined time interval has elapsed after photographing of the frame image (previous frame image) P shown in FIG. 7. The previous frame image P and the current frame image P' are temporally continuously acquired. The host vehicle travels backward before the predetermined time interval elapses after photographing of the frame image P shown in FIG. 7. Circles with dashed lines shown in FIG. 8 indicate positions of the feature points FP extracted from the previous frame image P shown in FIG. 7.

As illustrated in FIG. 8, when the host vehicle travels backwards, the feature points FP that exist in front of the host vehicle move away from the host vehicle. That is, the feature points FP appear at different positions in the current frame image P' and the previous frame image P. The determination part 121 associates the feature points FP of the current frame image P' with the feature points FP of the previous frame image P in consideration of values of picture elements near the feature points and calculates the optical flow OF based on respective positions of the associated feature points FP. The determination part 121 does not calculate the optical flow OF when there is not previous frame image. In this case, the presence or absence of the camera deviation is not determined. When a plurality of the feature points FP has been extracted from the frame image P, the optical flow OF is calculated for each of the plurality of the feature points FP.

Referring back to FIG. 6, when the optical flow OF of the feature points FP has been calculated, the determination part 121 calculates a motion vector V (a step S44) by performing a coordinate transformation of the optical flow OF given in a camera coordinate system. The coordinate transformation is to transform the camera coordinate system into a coordinate system on the road surface. The determination part 121 may first convert coordinates of the feature points FP extracted from the frame image P into coordinates on the road surface and calculate the motion vector V without calculating the optical flow OF.

Figure 9:
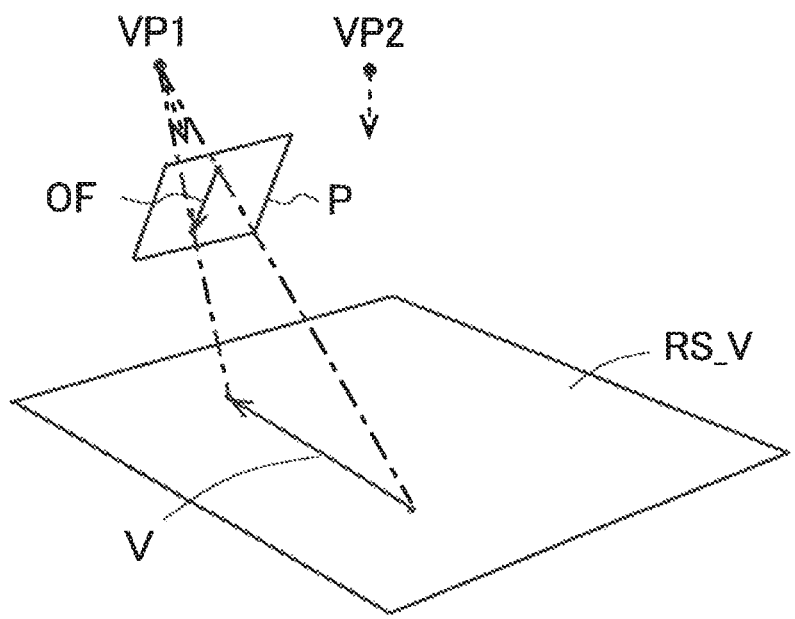
FIG. 9 illustrates a coordinate transformation process.

FIG. 9 illustrates a coordinate transformation process. As illustrated in FIG. 9, the determination part 121 converts the optical flow OF viewed from a position (viewpoint VP1) of the camera 21 into the motion vector V viewed form a viewpoint VP2 above the road surface RS on which the host vehicle exists. By projecting the optical flow OF on the frame image onto a virtual plane surface RS_V corresponding to the road surface, the determination part 121 converts the optical flow into the motion vector V. A size of the motion vector V indicates a movement amount (movement distance) on the road surface RS of the host vehicle. In this embodiment, since the camera 21 has a fish-eye lens, the coordinate transformation process preferably includes a distortion correction. When a plurality of the optical flows OF has been calculated, the motion vector V is calculated for each of the plurality of the optical flows OF.

Referring back to FIG. 6, when the motion vector V indicating the movement on the road surface RS has been calculated, the determination part 121 estimates the movement amount (movement distance) based on the motion vector V (a step S45). In this embodiment, the determination part 121 calculates the estimation value of the movement amount by performing a statistical process of the motion vector V. Specifically, the determination part 121 generates a histogram based on the motion vector V. The determination part 121 divides each of the motion vectors V into two types of components (i.e., one type is a front-rear direction component and the other type is a left-right direction component) to generate a first histogram and a second histogram.

Figure 10:
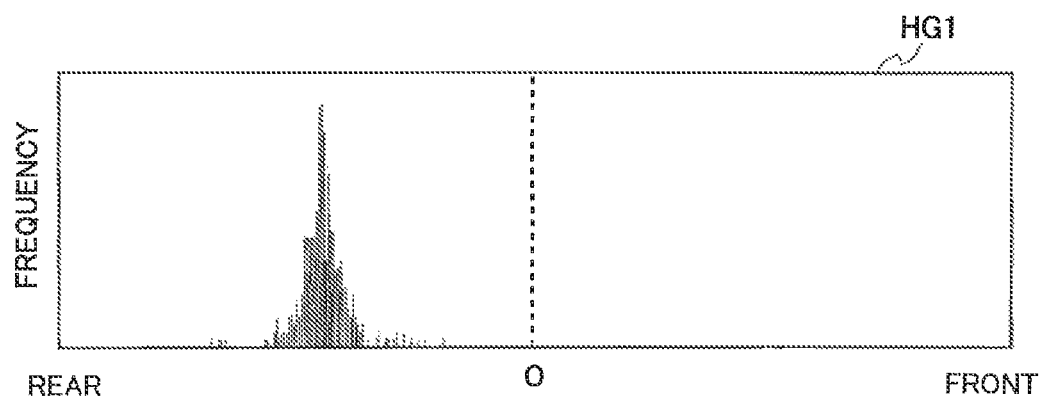
FIG. 10 illustrates one example of a first histogram.
Figure 11:
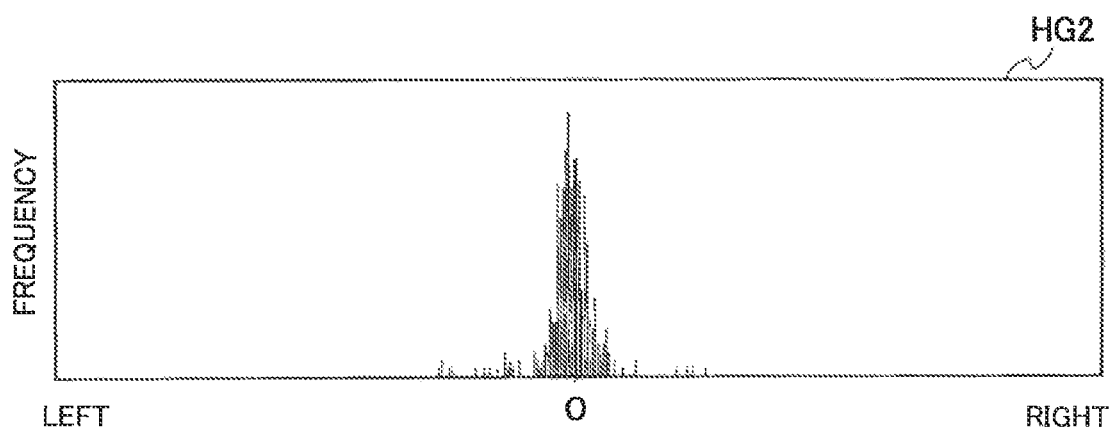
FIG. 11 illustrates one example of a second histogram.

FIG. 10 illustrates one example of a first histogram HG1 generated by the determination part 121. FIG. 11 illustrates one example of the second histogram HG2 generated by the determination part 121. The determination part 121 may perform a removal process of removing the motion vector V corresponding to predetermined conditions from all of the motion vectors V calculated earlier, before and after generation of the histograms HG1 and HG2. For example, the motion vector V whose size and direction are largely different from those expected from a speed, a steering angle, a shift lever position, etc. of the host vehicle may be removed. For example, in the histograms HG1 and HG2, the motion vector V belonging to a class whose frequency is extremely low may be removed.

The first histogram HG1 shown in FIG. 10 is a histogram obtained based on the front-rear direction component of the motion vector V. The first histogram HG1 is a histogram in which a number of the motion vectors V is a frequency and the movement amount in a front-rear direction (a length of the front-rear direction component of each of the motion vectors V) is a class. The second histogram HG2 shown in FIG. 11 is a histogram obtained based on the left-right direction component of the motion vector V. The second histogram HG2 is a histogram in which a number of the motion vectors V is a frequency and the movement amount in a left-right direction (a length of the left-right direction component of each of the motion vectors V) is a class.

FIG. 10 and FIG. 11 illustrate histograms obtained when the host vehicle travels straight backward. Each of FIG. 10 and FIG. 11 illustrates one example of the histogram obtained when the camera deviation has not occurred. The first histogram HG1 has a normal distribution shape in which the frequency increases unevenly toward a specific movement amount (class) on rear side. On the other hand, the second histogram HG2 has a normal distribution shape in which the frequency increases unevenly toward the class near the movement amount of zero. When the camera deviation has occurred, the shapes of the histograms will be changed.

In this embodiment, the determination part 121 uses a central value (median) of the first histogram HG1 as the estimation value of the movement amount in the front-rear direction. The determination part 121 uses a central value of the second histogram HG2 as the estimation value of the movement amount in the left-right direction. However, a determination method of the estimation value by the determination part 121 is not limited thereto. The determination part 121 may use, for example, the movement amount (the most frequent value) of the class in which the frequency of each of the histogram HG1 and the histogram HG2 is the maximum as the estimation value.

Referring back to FIG. 6, when the estimation value of the movement amount has been obtained, the determination part 121 compares the estimation value with a comparison value obtained by information from the sensor 3 to determine the presence or absence of the camera deviation (a step S46). In this embodiment, the determination part 121 compares the estimation value with the comparison value in terms of the movement amount in the front-rear direction. Furthermore, the determination part 121 compares the estimation value with the comparison value in terms of the movement amount in the left-right direction. The size of the deviation of the estimation value relative to the correct value is determined using the comparison value as the correct value. When the size of the deviation exceeds the predetermined threshold value, it is determined that the camera deviation has occurred.

The comparison value (movement amount) in the front-rear direction is calculated by a photographic time interval between two frame images for deriving the optical flow OF and a speed of the host vehicle obtained from the vehicle speed sensor 31 at the time interval. In this embodiment, the presence or absence of the camera deviation is determined based on the frame images obtained when the host vehicle is traveling straight forward or backward. As a result, the comparison value (movement amount) in the left-right direction becomes zero.

The comparison value may be calculated based on information from a device other than the sensor 3. For example, the comparison value may be calculated based on the information from a GPS sensor camera or a camera other than the camera for which a determination of the camera deviation is performed. The estimation value and the comparison value do not need to be the movement amount and, for example, may be the speed.

Figure 12:
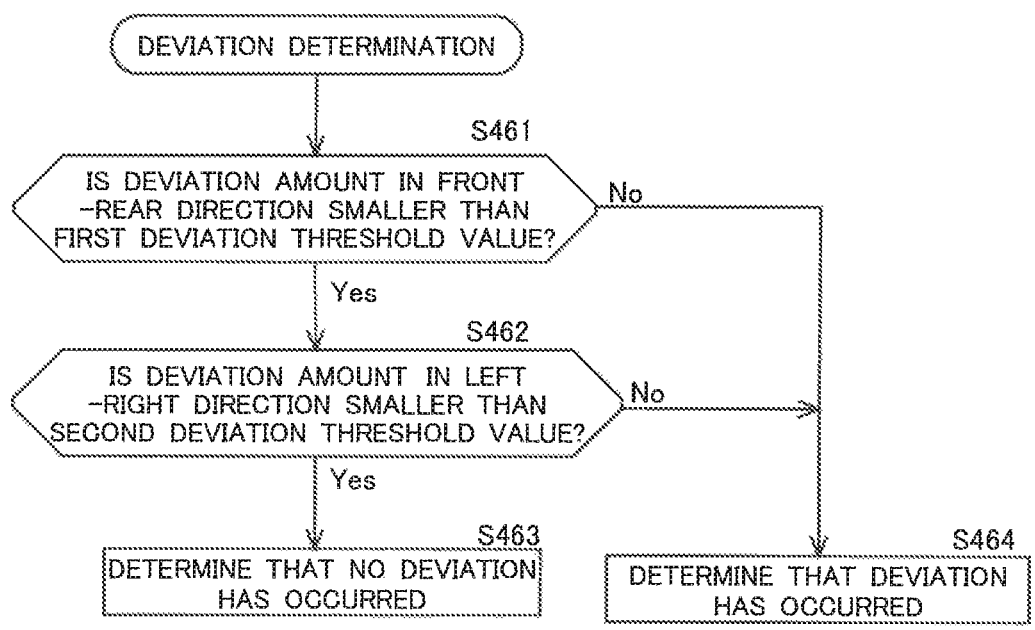
FIG. 12 is a flowchart illustrating one example of a deviation determination.

FIG. 12 is a flowchart illustrating one example of a deviation determination performed by the determination part 121. A process shown in FIG. 12 is a detailed process example of the step S46 in FIG. 6.

First, the determination part 121 confirms whether or not a size (deviation amount in the front-rear direction) of a difference between the estimation value and the comparison value is smaller than a first deviation threshold value in terms of the movement amount in the front-rear direction of the host vehicle (a step S461). When the deviation amount in the front-rear direction is equal to or larger than the first deviation threshold value (No in the step S461), the determination part 121 determines that the camera deviation has occurred (a step S464).

On the other hand, when the deviation amount in the front-rear direction is smaller than the first deviation threshold value (Yes in the step S461), the determination part 121 confirms whether or not a size (deviation amount in the left-right direction) of a difference between the estimation value and the comparison value is smaller than a second deviation threshold value in terms of the movement distance in the left-right direction of the host vehicle (a step S462). When the deviation amount in the left-right direction is equal to or larger than the second deviation threshold value (No in the step S462), the determination part 121 determines that the camera deviation has occurred (the step S464).

On the other hand, when the deviation amount in the left-right direction is smaller than the second deviation threshold value (Yes in the step S462), the determination part 121 determines that no camera deviation has occurred (a step S463).

In this embodiment, when at least one of the deviation amount in the front-rear direction and the deviation amount in the left-right direction increases, it is determined that the camera deviation has occurred. Thus, it is possible to reduce a possibility that even though the camera deviation has occurred, it is determined that no camera deviation has occurred. However, this is merely an example. For example, it may be determined that camera deviation has occurred only when both the deviation amount in the front-rear direction and the deviation amount in the left-right direction are large. Furthermore, the determination of the camera deviation may be performed based on not only the movement amounts in the front-rear direction and the left-right direction but also, for example, a combined index of these (e.g., a sum of squares of the movement amounts in the front-rear direction and the left-right direction). The determination of the camera deviation may be performed using only at least one of the movement amount in the front-rear direction and the movement amount in the left-right direction.

In this embodiment, the movement amount in the front-rear direction and the movement amount in the left-right direction are sequentially compared, but the comparison may be performed at the same timing. When the movement amount in the front-rear direction and the movement amount in the left-right direction are sequentially compared, the order is not particularly limited, and the comparison may be performed in a different order from that shown in FIG. 12.

Referring back to FIG. 6, when the deviation determination has ended, the determination part 121 confirms reliability of a deviation determination result (a step S47). Specifically, after acquiring the frame image for which the deviation determination result has been obtained, the determination part 121 confirms whether or not a process of forcibly switching (forced switching process of) the setting of the update cycle of the gain to the normal update cycle has been performed. When the forced switching process has been performed, the determination part 121 reduces the reliability of the deviation determination result for the frame image obtained at least just before the switching to the normal update cycle. Thus, the deviation determination result in which an illumination environment in which the camera 21 is placed has changed during the acquisition period of the frame image for the determination process so that the tracking of the feature point may not be performed correctly can be distinguished from other deviation determination results.

In this embodiment, the determination part 121 reduces the reliability of the deviation determination result obtained from the frame image acquired just before the switching to the normal update cycle. However, the determination part 121 may reduce the reliability not only for the frame image obtained just before the switching to the normal update cycle but also the frame image obtained earlier than the frame image obtained just before the switching to the normal update cycle.

The determination part 121 may destroy the deviation determination result whose reliability has been lowered. Thus, it is not necessary to handle the deviation determination result having low reliability thereafter and it is possible to reduce processing load. The determination part 121 may confirm reliability of process results in steps prior to the deviation determination. For example, the determination part may perform reliability confirmation after extraction of the feature point FP, estimation of the movement amount, and the like, and destroy process results in the extraction of the feature point FP, the estimation of the movement amount, and the like, which have low reliability. The determination part 121 may perform the reliability confirmation before performing the extraction of the feature point FP and destroy the frame image itself having low reliability.

When the deviation determination result has been obtained, the abnormality detection apparatus 1 ascertains the presence or absence of the camera deviation. The abnormality detection apparatus 1 may ascertain the presence or absence of the camera deviation based on the deviation determination result obtained by processing one frame image. However, the abnormality detection apparatus 1 preferably ascertains the presence or absence of the camera deviation based on the result obtained by processing a plurality of the frame images. As a result, it is possible to reduce a possibility of erroneous detection of the camera deviation.

For example, the deviation determination result may be obtained for each of the plurality of the frame images to ascertain the presence or absence of the camera deviation according to a number of times for the deviation determination, and the like. In another example, the motion vector V obtained in each of the frame images may be normalized so as not to depend on the speed of the vehicle, the normalized motion vector may be accumulated over the plurality of the frame images and the presence or absence of the camera deviation may be ascertained according to the accumulated result.

When the abnormality detection apparatus 1 detects the camera deviation, the abnormality detection apparatus 1 preferably informs the driver, etc. of an occurrence of the camera deviation using a display (not shown) to be arranged inside a vehicle cabin. The abnormality detection apparatus 1 preferably performs a process for stopping (turning off) a driving assistance function (for example, an automatic parking function, etc.) using information from the camera 21. At this time, the display preferably indicates that the driving assistance function has been stopped. When the plurality of the cameras 21 are mounted on the vehicle, if the camera deviation has occurred in at least one of the plurality of the cameras 21, a process of informing the driver, etc. and the process for stopping the driving assistance function are preferably performed.

When the abnormality detection apparatus 1 has detected no camera deviation, the abnormality detection apparatus 1 temporarily ends the detection process of the camera deviation. Then, the abnormality detection apparatus 1 restarts the detection process of the camera deviation at a predetermined timing.

In this embodiment, the update cycle of the gain of the AGC circuit 22 is controlled so that it is possible to create the environment in which it is easy to determine the presence or absence of the camera deviation and determine the presence or absence of the camera deviation. As a result, it is possible to reduce erroneous detection of the camera deviation.

<3. Modification>

Figure 13:
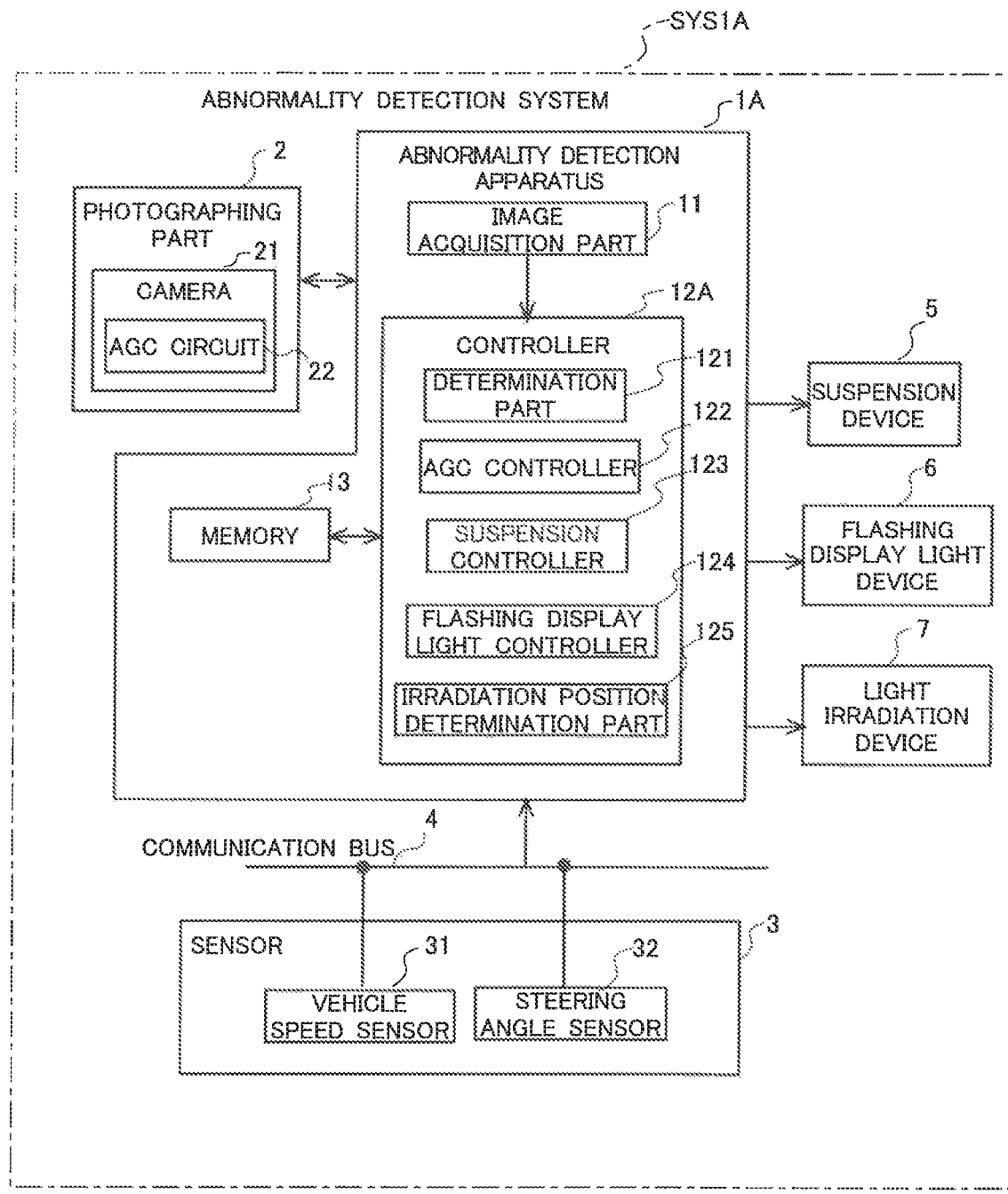
FIG. 13 is a block diagram illustrating a configuration of an abnormality detection system according to a modification.

FIG. 13 is a block diagram illustrating a configuration of an abnormality detection system SYS1A according to this modification. As illustrated in FIG. 13, the abnormality detection system SYS1A includes a suspension device 5, a flashing display light device 6 and a light irradiation device 7 in addition to a configuration of an abnormality detection system SYS1 described above. That is, the abnormality detection system SYS1A includes an abnormality detection apparatus 1A, a camera 21 having an AGC circuit 22, the suspension device 5, the flashing display light device 6 and the light irradiation device 7.

The abnormality detection system SYS1A does not need to include all of the suspension device 5, the flashing display light device 6 and the light irradiation device 7. That is, the abnormality detection system SYS1A may include the abnormality detection apparatus 1A, the camera 21 having the AGC circuit 22 and at least any one of the suspension device 5, the flashing display light device 6 and the light irradiation device 7.

The suspension device 5 is provided in a vehicle. The suspension device 5 is configured to control a distance between a road surface RS on which the vehicle moves and the camera 21. The suspension device 5 includes a suspension that is provided corresponding to each wheel of the vehicle and a damping adjuster that adjusts a damping force of the suspension. The damping adjuster may be configured to, for example, gradually adjust the damping force.

When the damping force is set to be high (hard) by the damping force adjuster, it is possible to reduce a vertical motion of a vehicle body (to which the camera 21 is attached) relative to the road surface RS. That is, it is possible to easily keep a constant positional relationship between the road surface RS and the camera 21. On the other hand, when the damping force is set to be low by the damping force adjuster, the vertical motion relative to the road surface RS occurs easily so that the positional relationship between the road surface RS and the camera 21 changes easily.

The suspension device 5 may be configured to include an air suspension and a height adjuster that adjusts a height position of the suspension by letting the air in and out. In this configuration, by letting the air in and out appropriately by the height adjuster, it is possible to keep a constant distance between the road surface and the vehicle body.

The flashing display light device 6 is provided in the vehicle to control ON/OFF states. The flashing display light device 6 includes a flashing display light and an ON/OFF switch that switches the ON/OFF states of the flashing display light. In this modification, the flashing display light is a hazard lamp of the vehicle.

The light irradiation device 7 is provided in the vehicle to be paired with the camera 21. In this modification, each of the cameras 21 is arranged on front, rear, left and right sides of the vehicle. As a result, each of the light irradiation devices 7 is provided on the front, rear, left and right sides of the vehicle. That is, in this modification, a number of the light irradiation devices 7 is four. The light irradiation device 7 irradiates a predetermined position. Specifically, the light irradiation device 7 is fixed and arranged in the vehicle so that a light pattern irradiated from the light irradiation device 7 is reflected in a predetermined range of the camera 21 to be paired with the light irradiation device 7. The light pattern may have a spot shape, for example, a round shape, etc., or shapes other than the spot shape. The light irradiation device 7 may be, for example, a laser device, a projector device, or the like.

The abnormality detection apparatus 1A includes an image acquisition part 11, a controller 12A and a memory in the same manner as the abnormality detection apparatus 1 described above. The controller 12A includes a suspension controller 123, a flashing display light controller 124 and an irradiation position determination part 125 in addition to a determination part 121 and an AGC controller 122. The suspension controller 123, the flashing display light controller 124 and the irradiation position determination part 125 are functional parts that are implemented by a CPU performing arithmetic processing, for example, in accordance with a program stored in the memory 13. In other words, the abnormality detection apparatus 1A further includes the suspension controller 123, the flashing display light controller 124 and the irradiation position determination part 125.

At least any one of the suspension controller 123, the flashing display light controller 124 and the irradiation position determination part 125 may be configured by hardware, such as an ASIC or an FPGA in the same manner as the determination part 121 and the AGC controller 122 described above. The abnormality detection apparatus 1A does not need to include any one or two of the suspension controller 123, the flashing display light controller 124 and the irradiation position determination part 125.

When a determination process is performed, the suspension controller 123 controls setting of the suspension of the vehicle. The suspension controller 123 controls the setting of the suspension of the vehicle to acquire a frame image for the determination process. The suspension controller 123 controls the damping force adjuster of the suspension device 5 to keep a constant distance between the camera 21 and the road surface RS.

For example, when a host vehicle decelerates, descends a downward slope, or the like, the host vehicle normally sinks forward. For example, when the host vehicle accelerates, ascends an upward slope, or the like, the host vehicle normally sinks backward. When such sinking occurs, the distance between the camera 21 and the road surface RS changes so that an accuracy of tracking a feature point FP may deteriorate. Therefore, in this modification, when the determination process is performed, the suspension controller 123 controls the damping force adjuster so that the damping force of the suspension becomes higher (harder). Then, it is possible to reduce an occurrence of sinking of the vehicle body caused by an acceleration and deceleration or the slope of the road surface RS and keep a constant relationship between the camera 21 and the road surface RS. As a result, it is possible to suppress a decrease of the accuracy of tracking the feature point FP.

When suspension device 5 includes the air suspension, the suspension controller 123 may control the height adjuster of the air suspension to keep a constant relationship between the camera 21 and the road surface RS.

When the determination process is performed, the flashing display light controller 124 controls the flashing display light of the vehicle. The flashing display light controller 124 controls the flashing display light of the vehicle to acquire the frame image for the determination process. When the flashing display light of the vehicle is in an operation state, an illumination environment around the vehicle changes so that the accuracy of tracking the feature point FP may decrease. Therefore, in this modification, when the determination process is performed, the flashing display light controller 124 controls an ON/OFF switch of the flashing display light to turn off the flashing display light. Thus, when the frame image for the determination process is acquired, it is possible to prevent the illumination environment from changing and prevent the accuracy of tracking the feature point FP from decreasing.

Figure 14:
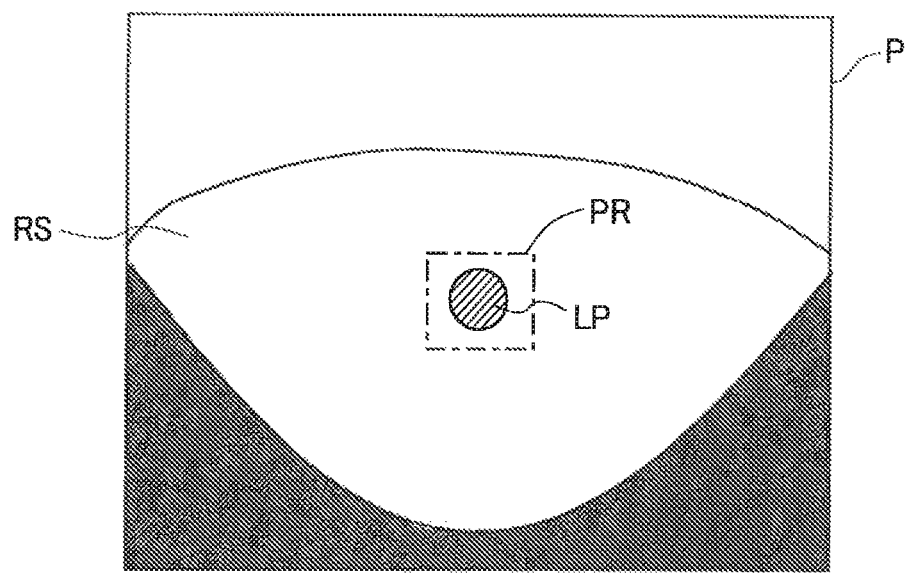
FIG. 14 is a schematic diagram illustrating a function of an irradiation position determination part.

The irradiation position determination part 125 determines whether or not an irradiation position of light in the frame image irradiated from the light irradiation device 7 mounted on the vehicle is positioned within a predetermined range. FIG. 14 is a schematic diagram illustrating a function of the irradiation position determination part 125. When the determination process is performed, the irradiation position determination part 125 causes the light irradiation device 7 to irradiate the light toward the road surface RS. As a result, for example, the light pattern having a spot shape is formed on the road surface. The irradiation position determination part 125 determines whether or not a light pattern LS formed on the road surface RS by the light irradiation device 7 is positioned within a predetermined range PR of a frame image P photographed by the camera 21.

For example, when the sinking of the vehicle described above has occurred, it may be configured that the irradiation position of the light pattern LS in the frame image P deviates from the predetermined range PR. Thus, by confirming a position of the light pattern LS in the frame image P, it is possible to determine whether or not to acquire the frame image for the determination process at an appropriate timing.

Figure 15:
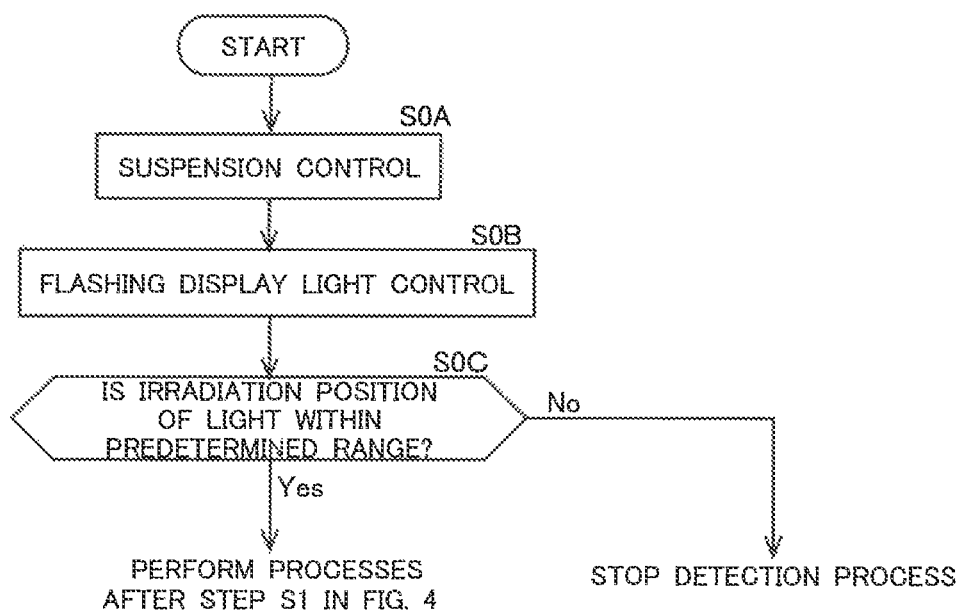
FIG. 15 is a flowchart illustrating a detection process of a camera deviation according to the modification.

FIG. 15 is a flowchart illustrating one example of a detection process of a camera deviation by the abnormality detection apparatus 1A according to the modification. As illustrated in FIG. 15, first, the suspension controller 123 controls the setting of the suspension (a step S0A). Thus, the damping force of the suspension is set to be high so that it is possible to suppress the vertical motion of the vehicle body.

Next, the flashing display light controller 124 controls the flashing display light (a step S0B). When the flashing display light is in an ON state, the flashing display light is turned off. When the flashing display light is in an OFF state, the OFF state of the flashing display light is continued. By turning the flashing display light off, it is possible to prevent the illumination environment around the host vehicle from changing.

Next, the irradiation position determination part 125 confirms whether or not the light pattern LS is positioned within the predetermined range PR of the frame image P (a step S0C). When the light pattern LS is within the predetermined range PR (Yes in the step S0C), the processes after the step S1 in FIG. 4 are performed. On the other hand, when the light pattern LS is outside the predetermined range PR (No in the step S0C), the detection process of the camera deviation is temporarily stopped. By stopping the detection process of the camera deviation, setting of the damping force of the suspension and an ON/OFF setting of the flashing display light may be returned to a state before starting the detection process of the camera deviation.

A situation in which the light pattern LS is outside the predetermined range PR may occur also when a deviation of the camera 21 has occurred. As a result, for example, when the situation in which the light pattern LS is outside the predetermined range PR occurs consecutively a plurality of times, it may be configured to inform an occupant of the host vehicle that the camera deviation may have occurred.

The order of the step S0A, the step S0B and the step S0C is not limited to the order shown in FIG. 15. The order thereof may be appropriately changed. For example, the step S0C may be first performed.

In a configuration of this modification, when the determination process is performed, control of the suspension and the flashing display light is performed in addition to control of an update cycle of a gain of the AGC circuit 22. As a result, it is possible to create an environment in which it is easy to determine a presence or absence of the camera deviation and determine the presence or absence of the camera deviation. Furthermore, in the configuration of this modification, by performing a confirmation process using the light irradiation device 7, the determination process is prevented from being performed in a situation that is inappropriate for the determination process. Therefore, according to this modification, it is possible to reduce erroneous detection of the camera deviation. In this modification, the abnormality detection apparatus 1A may be configured not to include the AGC controller 122. Even in this case, it is possible to create the environment in which it is easy to determine the presence or absence of the camera deviation and determine the presence or absence of the camera deviation.

<4. Notes>

The configurations of the embodiment and the modification described in the present specification are merely examples of the invention. The configurations of the embodiment and the modification may be appropriately changed without departing from the technical ideas of the invention. Furthermore, the embodiments and the modifications may be combined and implemented as long as no technical conflicts occur.

In the above, data that is used for detecting the abnormality of the camera 21 is collected when the host vehicle is traveling straight. However, this is merely an example, and the data that is used for detecting the abnormality of the camera 21 may be collected when the host vehicle is not traveling straight.

While the invention has been shown and described in detail, the foregoing description is in all aspects illustrative and not restrictive. It is therefore understood that numerous other modifications and variations can be devised without departing from the scope of the invention.

What is claimed is:

1. An abnormality detection apparatus for detecting an abnormality of a camera to be mounted on a mobile body, the apparatus comprising a processor and associated memory configured to:
    perform a determination process of determining a presence or absence of the abnormality of the camera based on a temporal change of a position of a feature point that is extracted from a frame image photographed by the camera; and
    suppress a gain change in an Automatic Gain Control ("AGC") circuit of the camera when the determination process is performed, wherein:
    the processor controls an update cycle of a gain and determines the presence or absence of the abnormality of the camera using the frame image acquired in a period in which the gain of the AGC circuit is constant;
    the processor is configured to select either (i) a normal update cycle, which is used as the update cycle when the determination process is not performed, or (ii) an update cycle for the determination process, which is used as the update cycle when the determination process is performed and is longer than the normal update cycle; and
    when a feedback control amount, which is a gain control amount in the AGC circuit, becomes equal to or greater than a predetermined amount while the processor selects the update cycle for the determination process, the processor forcibly switches setting of the update cycle to the normal update cycle.

2. The abnormality detection apparatus according to claim 1, wherein
    a length of the update cycle for the determination process is equal to or longer than a time required for the camera to acquire at least two frame images for the determination process.

3. The abnormality detection apparatus according to claim 1, wherein
when the setting of the update cycle is forcibly switched to the normal update cycle, the processor reduces reliability of a process result for a frame image obtained by the camera at least just before the switching.

4. The abnormality detection apparatus according to claim 3, wherein
the processor destroys the process result whose reliability has been reduced.

5. The abnormality detection apparatus according to claim 1, wherein
the processor further controls setting of a suspension of the mobile body.

6. The abnormality detection apparatus according to claim 1, wherein
the processor controls a flashing display light of the mobile body when the determination process is performed.

7. The abnormality detection apparatus according to claim 1, wherein
the processor determines whether or not an irradiation position of light in the frame image irradiated from a light irradiation device mounted on the mobile body is positioned within a predetermined range.

8. An abnormality detection system that detects an abnormality of a camera to be mounted on a mobile body, the system comprising:
the abnormality detection apparatus according to claim 1; and
a camera that has an AGC circuit.

9. An abnormality detection system comprising:
the abnormality detection apparatus according to claim 8;
a camera that has an AGC circuit; and
at least one of (i) a suspension device that is provided in a mobile body to control a distance between a road surface on which the mobile body moves and the camera, (ii) a flashing display light device that is provided in the mobile body to control ON/OFF states, and (iii) a light irradiation device that is provided in the mobile body to be paired with the camera and irradiates a predetermined position.

10. An abnormality detection method in which an apparatus detects an abnormality of a camera to be mounted on a mobile body, the method comprising the steps of:
(a) performing a determination process of determining a presence or absence of the abnormality of the camera based on a temporal change of a position of a feature point that is extracted from a frame image photographed by the camera;
(b) performing an Automatic Gain Control ("AGC") to suppress a gain change in an AGC circuit of the camera when the determination process is performed;
(c) controlling an update cycle of a gain and determining the presence or absence of the abnormality of the camera using the frame image acquired in a period in which the gain of the AGC circuit is constant;
(d) selecting either (i) a normal update cycle, which is used as the update cycle when the determination process is not performed, or (ii) an update cycle for the determination process, which is used as the update cycle when the determination process is performed and is longer than the normal update cycle; and
(e) when a feedback control amount, which is a gain control amount in the AGC circuit, becomes equal to or greater than a predetermined amount while the update cycle for the determination process is being selected, forcibly switching setting of the update cycle to the normal update cycle.

11. A non-transitory computer-readable medium storing instructions that, when executed by a processor of a controller, cause the controller to:
perform a determination process of determining a presence or absence of an abnormality of a camera to be mounted on a mobile body based on a temporal change of a position of a feature point that is extracted from a frame image photographed by the camera;
suppress a gain change in an Automatic Gain Control ("AGC") circuit of the camera when the determination process is performed;
control an update cycle of a gain and determine the presence or absence of the abnormality of the camera using the frame image acquired in a period in which the gain of the AGC circuit is constant;
select either (i) a normal update cycle, which is used as the update cycle when the determination process is not performed, or (ii) an update cycle for the determination process, which is used as the update cycle when the determination process is performed and is longer than the normal update cycle; and
when a feedback control amount, which is a gain control amount in the AGC circuit, becomes equal to or greater than a predetermined amount while the update cycle for the determination process is being selected, forcibly switch setting of the update cycle to the normal update cycle.

* * * * *